United States Patent
Tecson et al.

(10) Patent No.: US 9,534,725 B1
(45) Date of Patent: Jan. 3, 2017

(54) NOISE-ATTENUATION APPARATUS FOR PRESSURE REGULATORS

(71) Applicant: Emerson Process Management Regulator Technologies, Inc., McKinney, TX (US)

(72) Inventors: Joshua Logan Tecson, Bedford, TX (US); Roy Ronald Pelfrey, Sherman, TX (US); Justin Masias, McKinney, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 0 days.

(21) Appl. No.: 14/996,990

(22) Filed: Jan. 15, 2016

(51) Int. Cl.
*F16L 55/027* (2006.01)

(52) U.S. Cl.
CPC ............... *F16L 55/02718* (2013.01)

(58) Field of Classification Search
USPC .................................. 181/233, 223
See application file for complete search history.

(56) References Cited

U.S. PATENT DOCUMENTS

| | | | | |
|---|---|---|---|---|
| 825,010 | A * | 7/1906 | Snow ..................... | F01N 1/08 181/264 |
| 4,751,980 | A * | 6/1988 | DeVane ................... | F01N 1/04 181/224 |
| 7,325,474 | B2 * | 2/2008 | Yoshimura .............. | F01N 1/003 181/223 |
| 8,167,084 | B1 * | 5/2012 | Moore .................... | F41A 21/30 181/223 |
| 8,307,947 | B2 * | 11/2012 | Bussow .................. | F16L 55/0331 181/212 |
| D720,670 | S * | 1/2015 | Maholick ................ | D12/194 |
| 8,931,591 | B2 * | 1/2015 | Fagerlund ............... | F16L 55/0336 181/233 |
| 2016/0018178 | A1 * | 1/2016 | Johansen ................ | F41A 21/30 181/223 |

OTHER PUBLICATIONS

Emerson Process Management, Installation Guide, Oct. 2014, Retrieved at www.documentation.emersonprocess.com/groups/public/documents/safe_use_guides/d103068x014.pdf on Jan. 15, 2016, 10 pages.
Emerson Process Management, Type FL Pressure Reducing Regulators Bulletin 71.2.FL, Jul. 2015, Retrieved at www.documentation.emersonprocess.com/groups/public/documents/bulletins/d103067x012.pdf on Jan. 15, 2016, 32 pages.
Emerson Process Management, Pressure Regulators, 2014, Retrieved at www.documentation.emersonprocess.com/groups/public/documents/bulletins/0002en_fl_bul.pdf on Jan. 15, 2016, 20 pages.

* cited by examiner

*Primary Examiner* — Forrest M Phillips
(74) *Attorney, Agent, or Firm* — Hanley, Flight & Zimmerman, LLC (57) ABSTRACT

Noise attenuation apparatus for pressure regulators are disclosed. An example apparatus includes a first noise attenuator disposed at a first position in a fluid passageway of a pressure regulator and a second noise attenuator disposed at a second position in the fluid passageway. The second position is spaced apart from the first position along the fluid passageway. The example apparatus also includes fasteners extending between the first noise attenuator and the second noise attenuator to position the first noise attenuator at the first position and the second noise attenuator at the second position. The fasteners are to couple to peripheral portions of the noise attenuators.

21 Claims, 6 Drawing Sheets

NOISE-ATTENUATION APPARATUS FOR PRESSURE REGULATORS

CROSS-REFERENCE TO RELATED APPLICATIONS

This patent relates to subject matter disclosed in a U.S. patent application Ser. No. 14/997,052 entitled "Noise Attenuation Apparatus for Fluid Devices" and filed on Jan. 15, 2016, which is incorporated herein by reference in its entirety.

FIELD OF THE DISCLOSURE

This patent relates generally to pressure regulators and, more particularly, to noise-attenuation apparatus for pressure regulators.

BACKGROUND

Fluid valves and regulators are commonly distributed throughout process control and/or fluid distribution systems to control flow rates and/or pressures of various fluids (e.g., liquids, gases, etc.). In particular, fluid regulators are typically used to reduce and/or regulate a pressure of fluid to a predetermined value. Some fluid regulators reduce an inlet pressure to a lower outlet pressure by restricting flow through an orifice to match the downstream demand. For example, a pressure regulator may receive fluid (e.g., gas, liquid) having a relatively high and somewhat variable pressure from an upstream source and may regulate the fluid to have a lower, substantially stable pressure suitable for safe, efficient use by downstream equipment (e.g., equipment of a power generator, a petroleum refiner, etc.). In some instances, fluid flowing through the pressure regulators creates a significant amount of audible noise. Some pressure regulators employ noise-reduction devices to reduce the volume of audible noise created by the fluid flowing through the pressure regulator.

SUMMARY

In one example, an apparatus includes a first noise attenuator disposed at a first position in a fluid passageway of a pressure regulator and a second noise attenuator disposed at a second position in the fluid passageway. The second position is spaced apart from the first position along the fluid passageway. The example apparatus includes fasteners extending between the first noise attenuator and the second noise attenuator to position the first noise attenuator at the first position and the second noise attenuator at the second position. The fasteners are to couple to peripheral portions of the noise attenuators.

In another example, an apparatus includes an annular ring disposed in a fluid passageway of a noise-attenuation apparatus of a pressure regulator. The annular ring is coupled to a wall of the fluid passageway at a first position along the fluid passageway. The example apparatus includes fasteners extending through noise attenuators and coupled to the annular ring to fixedly position and space apart the noise attenuators along the fluid passageway. The fasteners are positioned along the wall at an outer portion of the fluid passageway.

In another example, an apparatus includes first means for attenuating noise disposed at a first position in a fluid passageway of a pressure regulator, second means for attenuating noise disposed at a second position in the fluid passageway that is spaced apart from the first position along the fluid passageway, and means for fastening extending between the first means for attenuating noise and the second means for attenuating noise. The means for fastening to position the first means for attenuating noise at the first position of the fluid passageway and the second means for attenuating noise at the second position. The means for fastening are positioned adjacent a wall defining the fluid passageway.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Many known process control and/or fluid distribution systems (e.g., power generation systems, petroleum refinery systems, etc.) employ pressure regulators to control flow rates and/or pressures of various fluids (e.g., liquids, gases, etc.). Fluid regulators are utilized within process control and/or fluid distribution systems to reduce and/or regulate a fluid pressure to a substantially constant value.

For example, known pressure regulators include an inlet that receives fluid from a source at a relatively high pressure and an outlet that provides fluid to downstream equipment at a relatively lower pressure than that of the inlet. The inlet pressure of some known pressure regulators is reduced to a lower outlet pressure by restricting flow through an orifice to match downstream demand. For example, known pressure regulators of process control and/or fluid distribution systems receive fluid (e.g., gas, liquid) having a relatively high and somewhat variable pressure from an upstream source and regulate the fluid flow to reduce and/or stabilize the pressure to a level suitable for use by downstream equipment (e.g., equipment of a power generator, a petroleum refiner, etc.).

In some instances, the pressure regulators produce a substantial decrease in pressure or flow rate of the fluid which, in turn, creates a significant amount of audible noise (e.g., greater than about 85 decibels). Pressure regulators may employ noise-reduction devices to reduce the volume of audible noise created by the fluid flowing through the pressure regulator.

Some noise-reduction devices are fluid pressure-reduction devices that include special internal fluid structures (e.g., filters, springs, etc.) to induce pressure drops. In some examples, fluid pressure-reduction devices include a series of spaced-apart plates and/or discs that incrementally reduce pressure (e.g., by a discrete amount, by a percentage of the previous fluid pressure) along a flow path of the pressure regulators. The pressure drops induced by the plates result in a corresponding reduction or attenuation in noise of the pressure regulators (e.g., by a discrete decibel level, by a percentage of the decibel level otherwise produced by the pressure regulator). In some examples, fluid flowing through the fluid pressure-reduction device applies a force on peripheral portions of the plates that causes the peripheral portions to bend, deflect, rotate and/or otherwise move away from a wall of the fluid passageway (e.g., in a downstream direction), thereby reducing an amount of noise attenuation provided by the plates.

The example apparatus disclosed herein position noise attenuators (e.g., noise-attenuation plates and/or discs, sets of noise-attenuation plates and/or discs) in a fluid passageway of a pressure regulator and increase structural support provided to the noise attenuators to prevent the noise attenuators from deforming to increase and/or maintain an amount of noise attenuation provided by the noise attenuators. The example apparatus reduces unacceptable high noise levels (e.g., greater than about 85 decibels) produced by regulators (e.g., pressure regulators) in fluid communication with the example apparatus to more acceptable low noise levels (e.g., less than about 85 decibels). For example, the apparatus disclosed herein reduce noise levels of regulators up to about 25 decibels and/or up to an about 40% reduction in flow rate coefficient ($C_g$).

An example apparatus disclosed herein includes noise attenuators disposed in a fluid passageway of a noise-attenuation apparatus of a pressure regulator. The noise attenuators are spaced apart from each other along the fluid passageway (e.g., along a central axis of the fluid passageway). Further, the example apparatus includes fasteners that extend between the noise attenuators to position the noise attenuators in the fluid passageway. For example, the fasteners position a first noise attenuator at a first position along an axis of the fluid passageway and position a second noise attenuator at second position along the axis that is spaced apart from the first position. The fasteners of the disclosed example couple to peripheral portions (e.g., a first peripheral portion, a second peripheral portion) of the respective noise attenuators (e.g., the first noise attenuator, the second noise attenuator) so that the fasteners are positioned adjacent to a wall of the fluid passageway.

Because the example fasteners disclosed herein are positioned along the peripheral portions of the respective noise attenuators, the fasteners deter and/or prevent the peripheral portions of the noise attenuators from bending and/or deforming away from the wall of the fluid passageway when forces are applied to the peripheral portions as a result of fluid flowing through the fluid passageway. Thus, the fasteners increase and/or maintain an amount of noise attenuation provided by the noise attenuators. In some examples, the fasteners are spaced equidistantly around the peripheral portions of the noise attenuators to more evenly distribute stress and/or strain in the noise attenuators that result from the fluid flow acting on the noise attenuators and, thus, reduce a likelihood of the noise attenuators breaking, bending, and/or otherwise failing over time.

In some examples, the fasteners extend through apertures defined by the noise attenuators to couple the noise attenuators together. For example, the fasteners extend through first apertures of the first noise attenuator and second apertures of the second noise attenuator. The apertures of the respective noise attenuators align to enable the fasteners to extend in a direction parallel to the axis of the fluid passageway to further increase the structural support the fasteners provide to the noise attenuators.

Some example apparatus disclosed herein include an annular ring that is to couple to the wall of the fluid passageway of the pressure regulator. The annular ring is to receive the fasteners to fixedly position the noise attenuators along the fluid passageway. The annular ring includes an outer surface that is to couple to the wall of the fluid passageway. In some examples, the outer surface defines a groove that is to receive a protruding edge of the wall to position the annular ring and, thus, the fasteners and the noise attenuators within the fluid passageway of the pressure regulator. The annular ring may engage or be integrally formed with one of the noise attenuators (e.g., a first noise attenuator). The annular ring and the fasteners are positioned adjacent the wall of the fluid passageway to enable a center portion of the noise attenuators to be free of fasteners that may undesirably alter the fluid flow through the noise attenuators and/or the fluid passageway.

In some examples, the fluid passageway tapers outwardly (e.g., diverges) toward an outlet of the noise-attenuation apparatus to reduce fluid pressure within the fluid passageway and, thus, increase noise attenuation produced by the noise-attenuation apparatus. To enable the noise attenuators to be positioned along the fluid passageway and adjacent the tapered wall of the fluid passageway, the noise attenuators have different diameters such that a noise attenuator closer to the outlet has a larger diameter than a noise attenuator further from the outlet.

Figure 1:
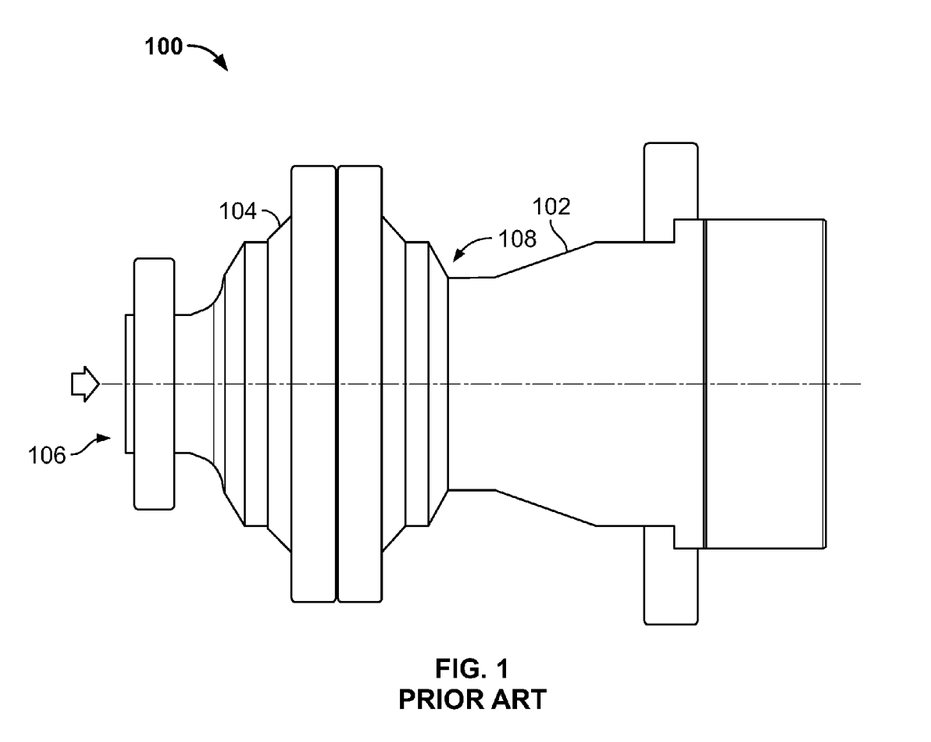
FIG. 1 is a side view of a known pressure regulator and a known noise-attenuation apparatus.
Figure 2:
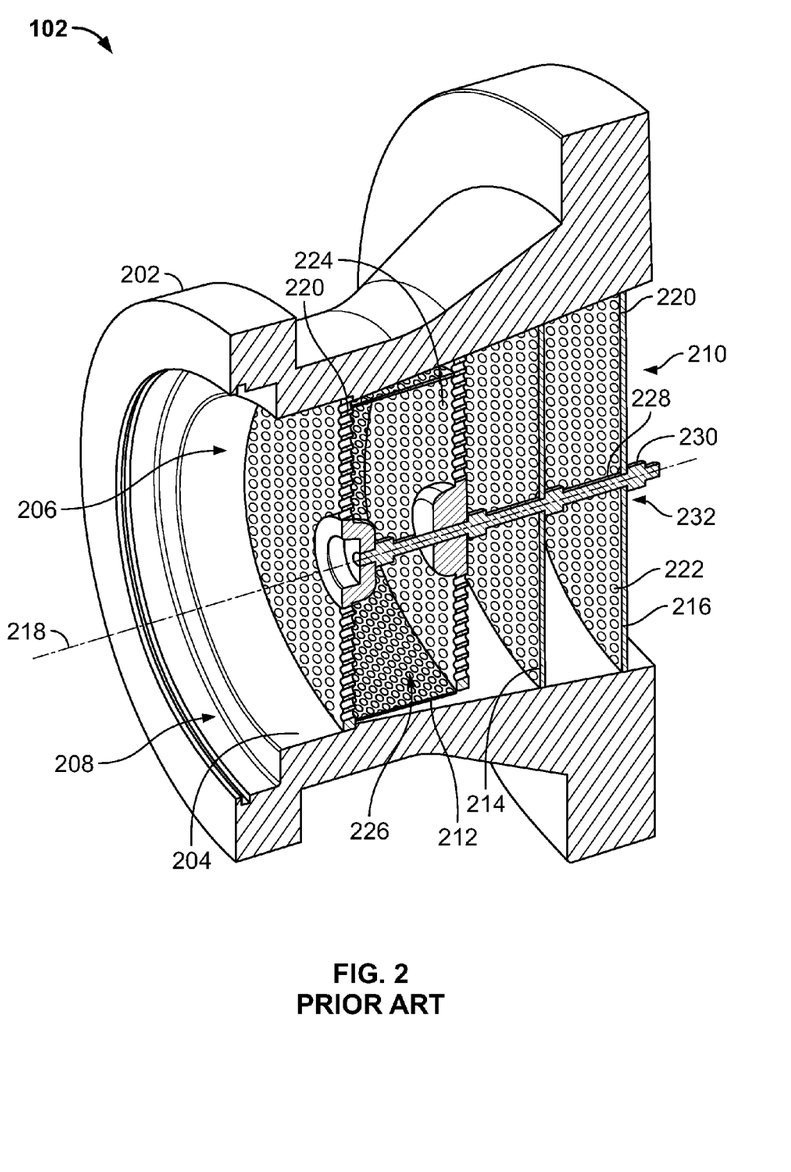
FIG. 2 is a perspective, cross-sectional view of the known noise-attenuation apparatus of FIG. 1.

Before discussing the example noise-attenuation apparatus and noise-attenuation assemblies disclosed herein, a brief description of a known fluid regulator assembly 100 and a known noise-attenuation apparatus 102 is provided in FIGS. 1 and 2. FIG. 1 illustrates the known fluid regulator assembly 100 that includes the known noise-attenuation apparatus 102 and a regulator 104. The fluid regulator assembly 100 is to process a fluid (e.g., natural gas, air, propane, nitrogen, hydrogen, carbon dioxide, etc.) through a passageway (e.g., an axial passageway) of the regulator 104 (e.g., a pressure regulator) between a regulator inlet 106 and a regulator outlet 108. The regulator inlet 106 of the illustrated example is capable of receiving a relatively high pressure fluid (e.g., between approximately 1200 psi and 1800 psi) from an upstream source and reduces the pressure at the regulator outlet 108 (e.g., down to about 10 psi) based on a predetermined or preset setting. Due to relatively large pressure drops of the fluid as the fluid flows between the regulator inlet 106 and the regulator outlet 108 and/or relatively high velocity fluid flow rate of the fluid exiting the regulator outlet 108, the fluid may generate unacceptable noise levels (e.g., greater than 85 decibels). The noise-attenuation apparatus 102 is in fluid communication with the outlet 108 of the regulator 104 and reduces the noise levels produced by the regulator 104 to a more acceptable noise level.

FIG. 2 is a perspective, cross-sectional view of the known noise-attenuation apparatus 102. The noise-attenuation apparatus 102 includes a body 202 and wall 204 that defines a fluid passageway 206 extending between an inlet 208 and an outlet 210. Noise attenuators 212, 214, and 216 are disposed along the fluid passageway 206. The noise attenuators 212, 214, 216 are spaced apart along an axis 218 of the fluid passageway 206, and each of the noise attenuators 212, 214, 216 includes a peripheral portion 220 that engages a portion of the wall 204 defining the fluid passageway 206. As illustrated in FIG. 2, the noise attenuators 214, 216 are noise-attenuation discs defining a plurality of fluid pathways 222, and the noise attenuator 212 is a cylindrical cage that defines a plurality of fluid pathways 224 and a cavity 226 that is to house a plurality of springs (e.g., hundreds or thousands of springs). The springs (not shown) disposed in the cavity 226 of the noise attenuator 212, the fluid pathways 224 of the noise attenuator 212, and the fluid pathways 222 of the noise attenuators 214, 216 combine to dissipate energy of fluid flowing through the fluid passageway 206 and, thus, reduce audible noise levels resulting from the regulator 104 (FIG. 1).

The known noise-attenuation apparatus 102 includes a fastener 228 (e.g., a threaded rod) that spaces apart and positions the noise attenuators 212, 214, 216 in the fluid passageway 206. Threaded fasteners 230 (e.g., nuts) threadably couple to the fastener 228 and engage the noise attenuators 212, 214, 216 to press the noise attenuators 212, 214, 216 against the wall 204 in the fluid passageway 206. As illustrated in FIG. 2, the fastener 228 extends through center portions 232 of the respective noise attenuators 212, 214, 216 along the axis 218 of the fluid passageway 206. Because the fastener 226 is centrally located relative to the noise attenuators 212, 214, 216, the fastener 226 may provide less structural support to the peripheral portions 220 of the noise attenuators 212, 214, 216 relative to the support provided to the center portions 232. In some instances, fluid flowing through the fluid passageway 206 applies a force to the peripheral portions 220 that causes the peripheral portions 220 to bend, deflect, rotate and/or otherwise move away from the wall 204. As a result of this displacement and/or deformation, the noise attenuators 212, 214, 216 may break and/or otherwise fail to attenuate the audible noise caused by fluid flowing through the regulator 104.

Figure 3A:
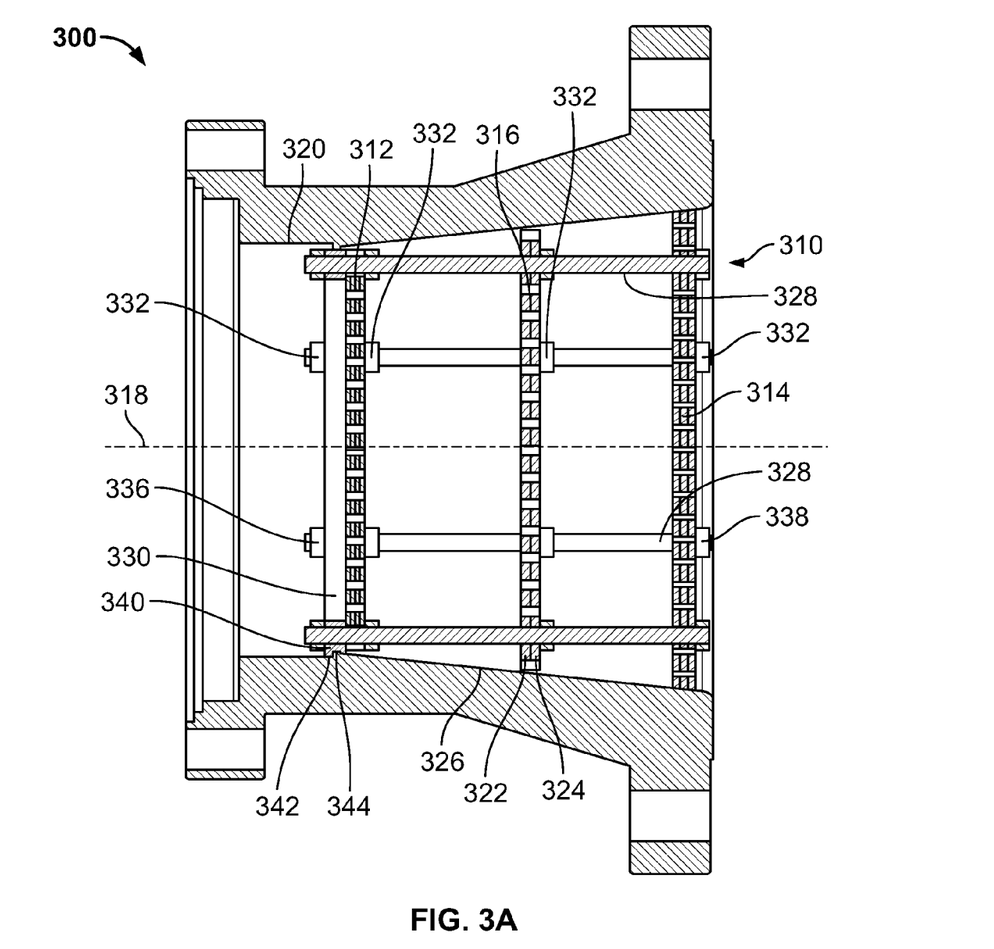
FIG. 3A is a side, cross-sectional view of an example noise-attenuation apparatus having an example noise-attenuation assembly in accordance with the teachings of this disclosure.
Figure 3B:
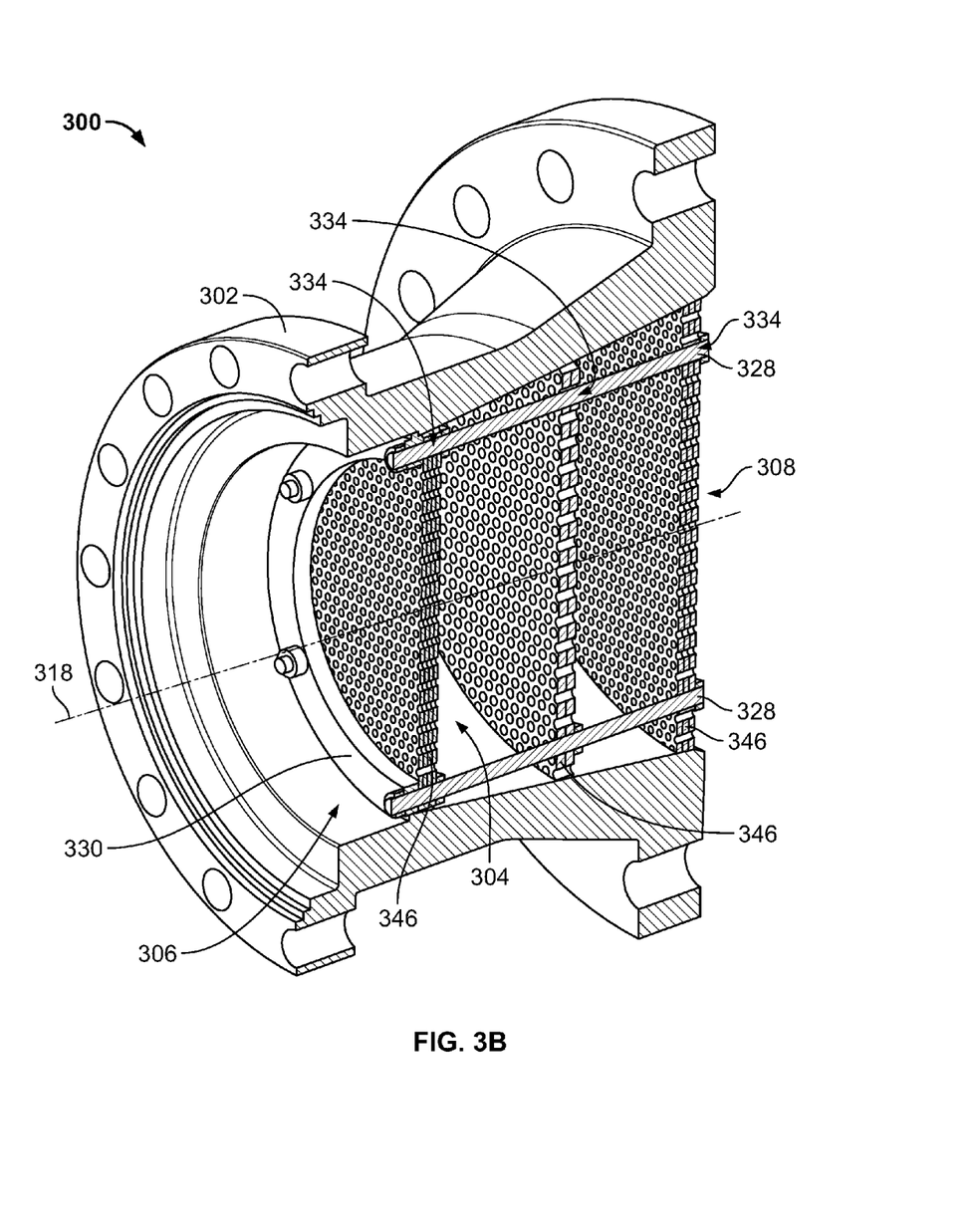
FIG. 3B is a perspective, cross-sectional view of the noise-attenuation apparatus and the noise-attenuation assembly of FIG. 3A.

FIGS. 3A and 3B illustrate an example noise-attenuation apparatus 300 in accordance with the teachings disclosed herein. More specifically, FIG. 3A is a side, cross-sectional view of the noise-attenuation apparatus 300 and FIG. 3B is a perspective, cross-section view of the noise-attenuation 300 apparatus. The noise-attenuation apparatus 300 includes a body 302 defining a fluid passageway 304 between an inlet 306 and an outlet 308 and an example noise-attenuation assembly 310 (e.g., a noise-abatement assembly) disposed in the fluid passageway 304. The noise-attenuation assembly 310 includes a first noise attenuator 312, a second noise attenuator 314, and a third noise attenuator 316 disposed in the fluid passageway 304 between the inlet 306 and the outlet 308 of the noise-attenuation apparatus 300. In other examples, the noise-attenuation assembly 310 may include more or fewer noise attenuators (e.g., one noise attenuator, two noise attenuators, four noise attenuators, six noise attenuators, etc.). In some examples, the noise attenuators 312, 314, 316 are composed of a metallic material such as steel.

The noise attenuators 312, 314, 316 (e.g., noise-suppression assemblies) are spaced apart from each other along an axis 318 of the fluid passageway 304 and are adjacent and/or engage a wall 320 defining the fluid passageway 304. For example, the noise attenuators 312, 314, 316 are spaced apart from each other by a distance of about between 1 inch and 4 inches. The example noise attenuators 312, 314, 316 are perpendicular to the axis 318 of the fluid passageway 304. In the illustrated example, each of the noise attenuators 312, 314, 316 includes a plurality of noise-attenuation plates or discs coupled together. For example, the third noise attenuator 316 includes a first noise-attenuation plate 322 and a second noise-attenuation plate 324 that are coupled together via mechanical fasteners (e.g., nuts and bolts), an adhesive, other fastening means and/or any combination thereof. In some examples, one or more of the noise attenuators 312, 314, 316 may include a single noise-attenuation plate.

The noise attenuators 312, 314, 316 of the illustrated example are disposed within a tapered portion 326 of the fluid passageway 304. A cross-section or an opening size of the tapered portion 326 gradually expands or increases between the inlet 306 and the outlet 308. In other words, at least a portion of the fluid passageway 304 (e.g., the tapered portion 326) is angled or tapered between the inlet 306 and the outlet 308 to dissipate energy of the fluid flow and/or to reduce noise. However, in some examples, the cross-section and/or opening size of the fluid passageway 304 of the example noise-attenuation apparatus 300 may be substantially constant or linear (e.g., straight).

To enable the noise attenuators 312, 314, 316 to engage and/or be adjacent the wall 320 of the tapered portion 326, the noise attenuators 312, 314, 316 have different diameters that correspond to the diameter of the tapered portion 326 at which the noise attenuators 312, 314, 316 are positioned. For example, the second noise attenuator 314 is closest to the outlet 308 of the diverging fluid passageway 304 and has a diameter greater than the diameters of the other noise attenuator 312, 316, and the first noise attenuator 312 is farthest from the outlet 308 and has a diameter less than that of the other noise attenuators 314, 316.

In operation, the noise-attenuation apparatus 300 reduces audible noise caused by high energy fluid flowing through a fluid passageway of a regulator (e.g., the regulator 104 of FIG. 1) and/or the fluid passageway 304 of the noise-attenuation apparatus 300 of a fluid regulator assembly (e.g., the fluid regulator assembly 100 of FIG. 1). For example, as the fluid exits an outlet (e.g., the outlet 108 of FIG. 1) of the regulator and passes between the inlet 306 and the outlet 308 of the noise-attenuation apparatus 300, the fluid flows through the noise-attenuation assembly 310 and/or the gradually-expanding fluid passageway 304 to dissipate energy of the fluid and, thus, attenuate, reduce, abate and/or suppress audible noise. For example, as the fluid flows past each of the noise attenuators 312, 314, 316 and/or along the tapered portion 326 of the fluid passageway 304, the pressure and/or velocity of the fluid is reduced, thereby providing a staged or incremental reduction or dissipation of energy of the fluid exiting the regulator.

To position the noise attenuators 312, 314, 316 within the fluid passageway 304, the noise-attenuation assembly 310 includes fasteners 328 (e.g., rods having threaded ends), an annular ring 330, and threaded fasteners 332 (e.g., nuts). The fasteners 328, the annular ring 330, and/or the threaded fasteners 332 are composed of, for example, a metallic material such as steel. In the illustrated example, each of the fasteners 328 has a length of about 10 inches and a diameter of about 0.5 inches.

As illustrated in FIGS. 3A and 3B, the fasteners 328 extend through the noise attenuators 312, 314, 316 via apertures 334 defined by the noise attenuators 312, 314, 316. The apertures 334 of each of the noise attenuators 312, 314, 316 align with the apertures 334 of the other of the noise attenuators 312, 314, 316 to enable the fasteners 328 to extend along a path that is parallel to the axis 318 of the fluid passageway 304. The fasteners 328 extend perpendicular to the noise attenuators 312, 314, 316 to increase an amount of structural support provided by the fasteners 328 to the noise attenuators 312, 314, 316.

The fasteners 328 of FIGS. 3A and 3B are threaded to enable the fasteners 328 to threadably couple to the threaded fasteners 332 (e.g., threaded nuts) of the noise-attenuation assembly 310. In the illustrated example, first ends 336 of the fasteners 328 extend through the annular ring 330 and are threadably received by the threaded fasteners 332 that engage the annular ring 330, and second ends 338 of the fasteners 328 extend through the noise attenuator 314 and are threadably received by the threaded fasteners 332 that engage the noise attenuator 314. As illustrated in FIGS. 3A and 3B, the annular ring 330 extends circumferentially along the wall 320 of the fluid passageway 304. An outer edge 340 of the annular ring 330 defines a groove 342 that receives a protruding edge 344 of the wall 320 to position the annular ring 330 within the fluid passageway 304.

In the illustrated example, the threaded fasteners 332 adjacent the annular ring 330 and the threaded fasteners 332 adjacent the noise attenuator 314 clamp the annular ring 330 against the protruding edge 344 of the wall 320 and clamp the noise attenuator 314 against the wall 320 to position the noise-attenuation assembly 310 in the fluid passageway 304. Further, the threaded fasteners 332 adjacent the noise attenuator 312 cause the noise attenuator 312 to engage the annular ring 330, and the threaded fasteners 332 adjacent the noise attenuator 316 press the noise attenuator 316 against the wall 320 between the noise attenuator 312 and the noise attenuator 314. Thus, as illustrated in FIGS. 3A and 3B, the threaded fasteners 332 and the fasteners 328 of the noise-attenuation assembly 310 fixedly position the noise attenuator 312 at a first position of the fluid passageway 304, the noise attenuator 314 at a second position that is spaced apart from the first position along the axis 318, and the noise attenuator 316 at a third position that is spaced apart from the first position and the second position.

In the illustrated example, the noise-attenuation assembly 310 includes six fasteners 328 that couple to peripheral portions 346 of the noise attenuators 312, 314, 316. However, in other examples, the noise-attenuation assembly 310 may include more (e.g., 7, 8, 9, etc.) or less (e.g., 5, 4, 3, etc.) fasteners 328 to position the noise attenuators 312, 314, 316. As illustrated in FIGS. 3A and 3B, the fasteners 328 and the apertures 334 that receive the fasteners 328 are distributed equidistantly about the peripheral portions 346 of the noise attenuators 312, 314, 316 to improve distribution of stresses and/or strains throughout the noise attenuators 312, 314, 316. In the illustrated example, the six fasteners 328 are spaced apart equidistantly from each other by about 60 degrees relative the axis 318 of the fluid passageway 304 along the peripheral portions 346 of the noise attenuators 312, 314, 316. In other examples, the fasteners 328 are non-equidistantly spaced and/or are spaced apart by angles greater than or less than 60 degrees. The positioning of the fasteners 328 deters and/or prevents the peripheral portions 346 from bending, deforming, rotating and/or otherwise moving away from the wall 320 when a force is applied from fluid flow and, thus, maintain an amount of noise attenuation (e.g., noise reduction, noise abatement, noise suppression) provided by the noise-attenuation assembly 310 of the noise-attenuation apparatus 300.

Figure 4A:
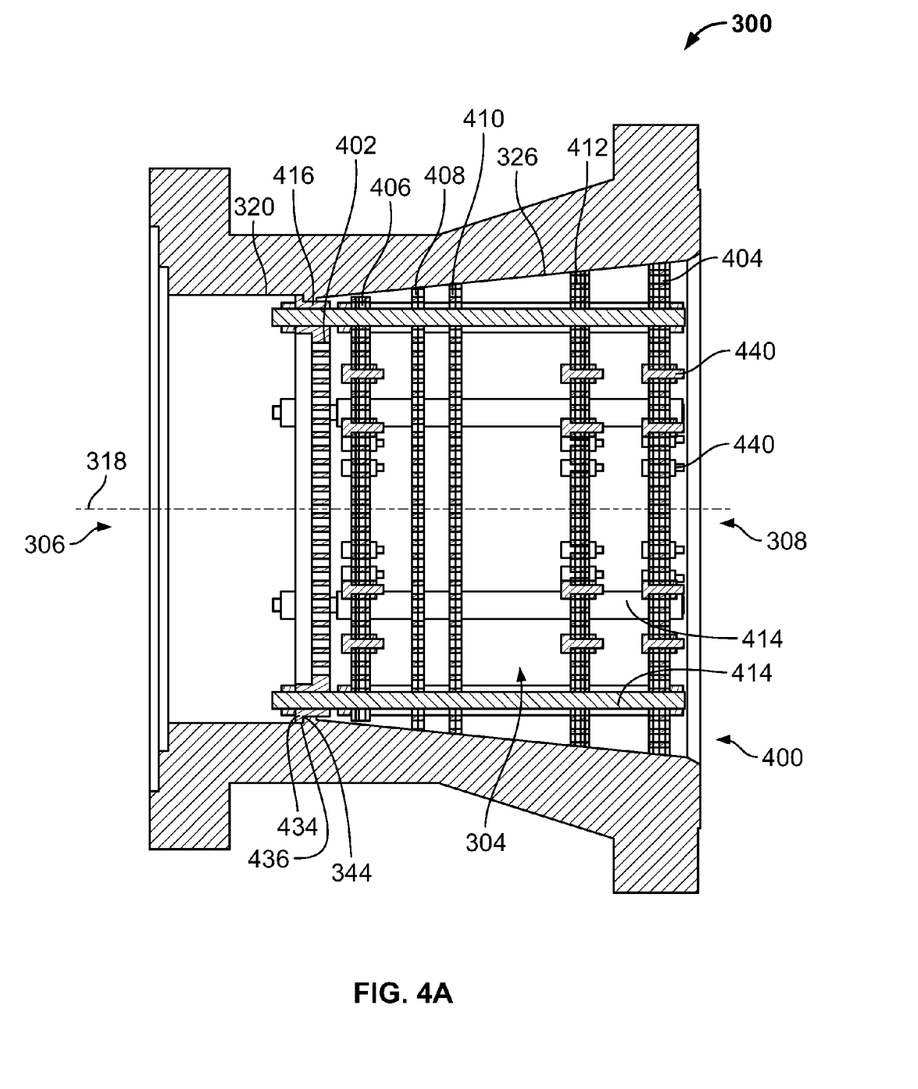
FIG. 4A is a side, cross-sectional view of the noise-attenuation apparatus of FIGS. 3A and 3B having another noise-attenuation assembly in accordance with the teachings of this disclosure.
Figure 4B:
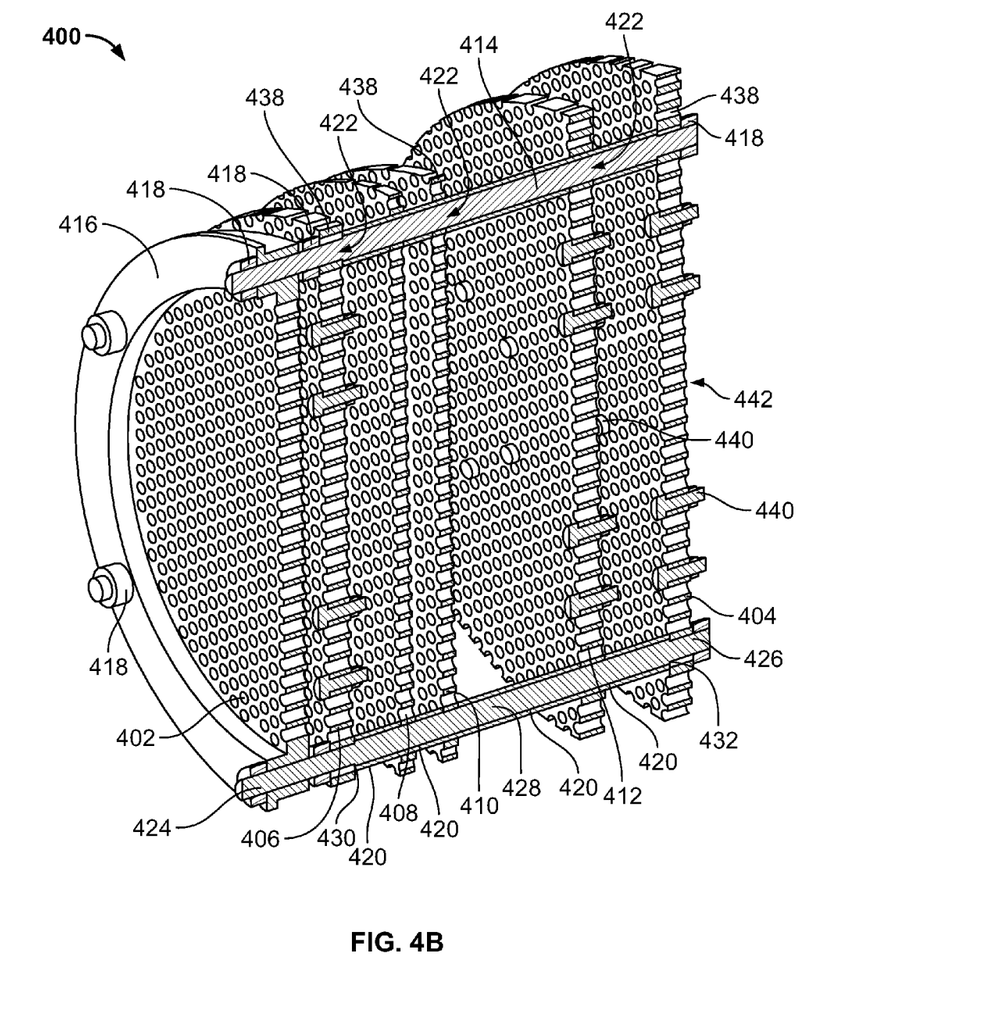
FIG. 4B is a perspective, cross-sectional view of the noise-attenuation assembly of FIG. 4A.

FIGS. 4A and 4B disclose another example noise-attenuation assembly 400 (e.g., a noise-abatement assembly) disposed in the fluid passageway 304 of the example noise-attenuation apparatus 300. More specifically, FIG. 4A is a side, cross-sectional view of the example noise-attenuation apparatus 300 and the example noise-attenuation assembly 400, and FIG. 4B is a perspective, cross-sectional view of the example noise-attenuation assembly 400.

As illustrated in FIGS. 4A and 4B the noise-attenuation assembly 400 is disposed in the fluid passageway 304 between the inlet 306 and the outlet 308 of the noise-attenuation apparatus 300. The noise-attenuation assembly 400 includes a first noise-attenuation noise attenuator 402, a second noise attenuator 404, a third noise attenuator 406, a fourth noise attenuator 408, a fifth noise attenuator 410, and a sixth noise attenuator 412 spaced apart from each other and disposed in the fluid passageway 304 between the inlet 306 and the outlet 308 of the noise-attenuation apparatus 300. In other examples, the noise-attenuation apparatus 400 may include more or fewer noise attenuators (e.g., one noise attenuator, three noise attenuators, five noise attenuators, eight noise attenuators, etc.). In the illustrated example, the first noise attenuator 402 includes a single noise-attenuation plate and each of the other noise attenuators 404, 406, 408, 410, 412 includes a plurality of noise-attenuation plates coupled together. In other examples, the first noise attenuator 402 includes a plurality of noise-attenuation plates coupled together and/or one or more of the noise attenuators 404, 406, 408, 410, 412 include a single noise-attenuation plate. The noise attenuators 402, 404, 406, 408, 410, 412 (e.g., noise-suppression assemblies) of the illustrated example have different diameters to enable the noise attenuators 402, 404, 406, 408, 410, 412 to engage the wall 320 along the tapered portion 326 of the fluid passageway 304. In operation, the noise attenuators 402, 404, 406, 408, 410, 412 of the noise-attenuation assembly 400 and/or the tapered portion 326 of the fluid passageway 304 dissipate energy of the fluid flow to attenuate, reduce, abate and/or suppress audible noise caused by high energy fluid flow through a fluid regulator assembly (e.g., the fluid regulator assembly 100 of FIG. 1).

To position the noise attenuators 402, 404, 406, 408, 410, 412 within the fluid passageway 304, the noise-attenuation assembly 400 includes fasteners 414, an annular ring 416, threaded fasteners 418, and spacers 420. The fasteners 414 extend through apertures 422 of the noise attenuators 402, 404, 406, 408, 410, 412 along a path that is parallel to the axis 318 of the fluid passageway 304 to increase an amount of structural support provided to the noise attenuators 402, 404, 406, 408, 410, 412.

In the illustrated example, each of the fasteners 414 includes a threaded first end 424, a threaded second end 426 opposite the first end 424, and an unthreaded portion 428 between the first end 424 and the second end 426. The first and second ends 424, 426 of the example fasteners 414 are threaded to enable the threaded fasteners 418 (e.g., threaded nuts) to couple to the fasteners 414. The unthreaded portion 428 has a greater diameter than that of the threaded first and second ends 424, 426 so that the unthreaded portion 428 defines a first shoulder or lip 430 adjacent the first end 424 and a second shoulder or lip 432 adjacent the second end 426.

The first ends 424 of the fasteners 414 extend through the annular ring 416 and are threadably received by the threaded fasteners 418 that engage the annular ring 416, and the second ends 326 extend through the second noise attenuator 404 and are threadably received by the threaded fasteners 418 that engage the second noise attenuator 404. In the illustrated example, the annular ring 416 is integrally formed with the first noise attenuator 402 and extends circumferentially along the wall 320 of the fluid passageway 304. An outer edge 434 of the annular ring 416 defines a groove 436 that receives the protruding edge 344 of the wall 320 to position the annular ring 416 and, thus, the integrally-formed first noise attenuator 402 within the fluid passageway 304. The threaded fasteners 418 adjacent the annular ring 416 and the threaded fasteners 418 adjacent the second noise attenuator 404 clamp the annular ring 416 against the protruding edge 344 of the wall 320 to position the noise-attenuation assembly 400 in the fluid passageway 304.

As illustrated in FIGS. 4A and 4B, the fasteners 414, the threaded fasteners 418, and the spacers 420 of the noise-attenuation assembly 400 space apart and position the noise attenuators 402, 404, 406, 408, 410, 412 along the axis 318 of the fluid passageway 304. For example, the first noise attenuator 402 is integrally formed with the annular ring 416 and is fixedly positioned between the protruding edge 344 of the wall 320 and the adjacent threaded fasteners 418; the second noise attenuator 404 is fixedly positioned between the adjacent threaded fasteners 418 and the second lips 432 of the respective fasteners 414; the third noise attenuator 406 is fixedly positioned between the adjacent threaded fasteners 418 and the first lips 430 of the respective fasteners 414; and each of the remaining noise attenuators 408, 410, 412 is fixedly positioned between opposing spacers 420 that enclose portions of the unthreaded portions 428 of the respective fasteners 414.

As illustrated in FIGS. 4A and 4B, the fasteners 414 are distributed equidistantly about peripheral portions 438 of the noise attenuators 402, 404, 406, 408, 410, 412 to improve distribution of stresses and/or strains throughout the noise attenuators 402, 404, 406, 408, 410, 412. For example, the noise-attenuation assembly 400 illustrated in FIGS. 4A and 4B includes six of the fasteners 414 are equidistantly spaced apart from each other by about 60 degrees relative the axis 318 of the fluid passageway 304 along the peripheral portions 438 of the noise attenuators 402, 404, 406, 408, 410, 412. In other examples, the fasteners 414 are non-equidistantly spaced and/or are spaced apart by angles greater than or less than 60 degrees. The positioning of the fasteners 414 deters and/or prevents the peripheral portions 438 from bending, deforming, rotating and/or otherwise moving away from the wall 320 when a force is applied from fluid flow and, thus, maintains an amount of noise attenuation (e.g., noise reduction, noise abatement, noise suppression) provided by the noise-attenuation assembly 400 of the noise-attenuation apparatus 300. Further, in the illustrated example, the noise-attenuation assembly 400 includes fasteners 440 (e.g., mechanical fasteners such as threaded bolts and nuts) that extend through and clamp together the noise-attenuation plates of one the noise attenuators 404, 406, 408, 410, 412. In the illustrated example, the fasteners 440 are clamped to one of the noise attenuators 404, 406, 412. The fasteners 440 provide additional structural support to a center portion 442 of the respective noise attenuators 404, 406, 412 and/or further improve distribution of stresses and/or strains throughout the noise attenuators 404, 406, 412 to further maintain an amount of noise attenuation provided by the noise-attenuation assembly 400.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
    a first noise attenuator including an annular ring that couples to a wall of a fluid passageway of a pressure regulator to position the first noise attenuator at a first axial position in the fluid passageway;
    a second noise attenuator positioned at a second axial position in the fluid passageway, the second axial position spaced apart from the first axial position along the fluid passageway; and
    fasteners coupling to and extending between the annular ring of the first noise attenuator and a peripheral portion of the second noise attenuator to retain the first noise attenuator at the first axial position and the second noise attenuator at the second axial position.

2. The apparatus of claim 1, wherein the annular ring includes an outer surface defining a groove, the groove is to receive a protruding edge of a wall of the fluid passageway to position the first noise attenuator at the first axial position.

3. The apparatus of claim 1, wherein each of the fasteners includes a first threaded end, a second threaded end opposite the first threaded end, and an unthreaded portion extending between the first threaded end and the second threaded end, the unthreaded portion defining a first lip adjacent the first threaded end and a second lip adjacent the second threaded end.

4. The apparatus of claim 3, wherein the first threaded end extends through the first noise attenuator and is threadably received by a second threaded fastener adjacent the first noise attenuator to position the first noise attenuator at the first axial position.

5. The apparatus of claim 3, wherein the second threaded end extends through the second noise attenuator and is threadably received by a third threaded fastener adjacent the second noise attenuator to position the second noise attenuator against the second lip of each of the fasteners at the second axial position in the fluid passageway.

6. The apparatus of claim 3, further including a third noise attenuator positioned at a third axial position between the first noise attenuator and the second noise attenuator, the first threaded end of each of the fasteners extends through the third noise attenuator and is threadably received by a third threaded fastener adjacent the third noise attenuator to position the third noise attenuator against the first lip of each of the fasteners at the third axial position in the fluid passageway.

7. The apparatus of claim 6, further including a fourth noise attenuator positioned at a fourth axial position between the second noise attenuator and the third noise attenuator in the fluid passageway, the fourth noise attenuator is positioned between first spacers and second spacers that partially enclose the fasteners, the first spacers extend between the second noise attenuator and the fourth noise attenuator, the second spacers extend between the third noise attenuator and the fourth noise attenuator to position the fourth noise attenuator at the fourth axial position in the fluid passageway.

8. The apparatus of claim 1, wherein the annular ring of the first noise attenuator defines first apertures and the peripheral portion of the second noise attenuator defines second apertures through which the fasteners extend, the first apertures and the second apertures align radially so that the fasteners extend through the first apertures and second apertures in a direction parallel to a central axis of the fluid passageway.

9. The apparatus of claim 8, wherein the first apertures are spaced equidistantly and the second apertures are spaced equidistantly to enable the fasteners to be spaced equidistantly when the fasteners extend through the first noise attenuator and the second noise attenuator.

10. The apparatus of claim 1, wherein the first noise attenuator has a first diameter and the second noise attenuator has a second diameter different than the first diameter to enable the first noise attenuator and the second noise attenuator to engage a tapered wall of the fluid passageway.

11. The apparatus of claim 1, wherein at least one of the first noise attenuator or the second noise attenuator includes a plurality of noise-attenuation plates coupled together.

12. The apparatus of claim 1, wherein the fasteners couple to the annular ring of the first noise attenuator and the peripheral portion of the second noise attenuator adjacent the wall of the fluid passageway to prevent the annular ring and the peripheral portion from deforming away from the wall when fluid forces act on the first and second noise attenuators.

13. An apparatus comprising:
an annular ring disposed in a fluid passageway of a noise-attenuation apparatus of a pressure regulator, the annular ring coupled to a wall of the fluid passageway at a first axial position along the fluid passageway; and
fasteners extending through noise attenuators and coupled to the annular ring to fixedly position and space apart axially the noise attenuators along the fluid passageway, the fasteners positioned along the wall at an outer portion of the fluid passageway.

14. The apparatus of claim 13, wherein the annular ring engages or is integrally formed with one of the noise attenuators.

15. The apparatus of claim 13, wherein the annular ring includes an outer surface that engages the wall of the fluid passageway, the outer surface defines a groove that receives a protruding edge of the wall to position the annular ring relative the wall of the fluid passageway.

16. The apparatus of claim 15, wherein the fasteners include threaded ends that extend through apertures of the annular ring and are threadably received by threaded fasteners adjacent the annular ring to couple the annular ring to the protruding edge of the wall.

17. The apparatus of claim 13, wherein the fasteners are positioned equidistantly radially around the annular ring.

18. The apparatus of claim 13, wherein the annular ring and the fasteners are positioned adjacent the wall of the fluid passageway to prevent peripheral portions of the noise attenuators from deforming away from the wall when fluid flow forces act on the noise attenuators.

19. The apparatus of claim 13, wherein the annular ring and the fasteners are positioned along the wall of the fluid passageway to enable center portions of the noise attenuators to be free of fasteners.

20. An apparatus comprising:
first means for attenuating noise including means for coupling the first means for attenuating noise to a wall to position the first means for attenuating noise at a first axial position in a fluid passageway of a pressure regulator;
second means for attenuating noise positioned at a second axial position in the fluid passageway that is spaced apart from the first axial position along the fluid passageway; and
means for fastening extending between the first means for attenuating noise and the second means for attenuating noise, the means for fastening received by the means for coupling to retain the first means for attenuating noise at the first axial position of the fluid passageway and the second means for attenuating noise at the second axial position, the means for fastening positioned adjacent a wall defining the fluid passageway.

21. The apparatus of claim 20, wherein the means for fastening couples to the means for coupling to prevent the first means for attenuating from deforming away from the wall of the fluid passageway when fluid forces act on the first means for attenuating.

* * * * *